United States Patent [19]

Krüger et al.

[11] Patent Number: 5,654,373
[45] Date of Patent: Aug. 5, 1997

[54] PEROXIDE CURABLE FLUORORUBBERS CONTAINING NO CURE-SITE MONOMERS

[75] Inventors: Ralf Krüger; David Harrison, both of Köln; Dieter Wrobel, Leverkusen, all of Germany

[73] Assignee: Bayer Aktiengesellschaft, Leverkusen, Germany

[21] Appl. No.: 423,905

[22] Filed: Apr. 18, 1995

[30] Foreign Application Priority Data

Apr. 25, 1994 [DE] Germany ............ 44 14 334.6

[51] Int. Cl.$^6$ .................................................. C08F 8/00
[52] U.S. Cl. ............................... 525/326.3; 525/387
[58] Field of Search ......................... 525/326.3, 387

[56] References Cited

U.S. PATENT DOCUMENTS

| | | | |
|---|---|---|---|
| 3,632,847 | 1/1972 | Hartwimmer | 260/92.1 |
| 3,859,262 | 1/1975 | Hartwimmer | 260/80.77 |
| 4,338,237 | 7/1982 | Sulzbach et al. | 524/777 |
| 4,758,618 | 7/1988 | Ito et al. | 524/430 |
| 5,153,285 | 10/1992 | Felix et al. | 526/206 |

FOREIGN PATENT DOCUMENTS

| | | |
|---|---|---|
| 0547771 | 6/1993 | European Pat. Off. . |
| 0581114 | 2/1994 | European Pat. Off. . |
| 2132463 | 1/1973 | Germany . |

OTHER PUBLICATIONS

Ullmann's Encyclopedia of Industrial Chemistry, vol. A23, Rubber, 2. Synthetic, pp. 265–269.
D.E. Hull, Kautschuk +Gummi . Kunststoffe 38. Jahrgang, No. Jun. 1985, pp. 480–484.
D.E. Hull, Kautsch. Gummi Kunstst., vol. 38, pp. 480–484, (1985).
Ullmann's Encyclopedia of Industrial Chemistry, 5th ed., vol. A23, chapter 2.6, pp. 265–269, (1993).

Primary Examiner—Edward J. Cain
Attorney, Agent, or Firm—Sprung Horn Kramer & Woods

[57] ABSTRACT

Peroxide curable fluororubbers, which contain no cure-site units in addition to the fluoromonomers forming the polymer chain, and a process for their production.

8 Claims, No Drawings

PEROXIDE CURABLE FLUORORUBBERS CONTAINING NO CURE-SITE MONOMERS

The present invention relates to peroxide curable fluororubbers which contain no cure-site units in addition to the fluoromonomers forming the polymer chain, and to a process for their production.

Fluoropolymers are used industrially whenever particular properties, such as low surface tension or elevated chemical resistance, are required. For use in the fluoroelastomer sector, the fluororubbers must be cured after shaping.

In the case of known, unmodified fluororubbers based on vinylidene fluoride and hexafluoropropene and other fluoromonomers, unless special reactive sites are introduced, this curing requires severe conditions, which may damage the fluoropolymer. The most commonly used types of vulcanization used in this connection are bisamine or bisphenol vulcanization (Ullmann's Encyclopedia of Industrial Chemistry, 5th edition, 1993, vol. A 23, chapter 2.6, pages 265–269).

In order to avoid severe reaction conditions for curing, reactive sites, so-called cure-sites, are introduced into the polymer chain, at which sites crosslink points may be created highly selectively by means of a curing catalyst and optionally a co-curing agent, without there being any need to attack the remaining part of the polymer backbone. According to the prior art, such cure-site units are introduced during the polymerization stage by copolymerizing a monomer containing reactive groups, for example bromotrifluoroethylene, with the fluoromonomers forming the polymer chain and/or polymerizing the stated fluoromonomers in the presence of a saturated compound containing iodine or bromine and iodine, which compound acts as a chain transfer agent. The monomers forming the polymer chain are, however, excluded from the term cure-site monomer.

Such peroxide cured fluoroelastomers have significantly improved resistance to bases, nucleophiles and oxidative attack in comparison with, for example, bisphenol cured grades. A substantial disadvantage of these fluoroelastomers is, however, that additional compounds must be present for the polymerization which are incorporated into the fluoropolymers. These compounds are generally costly, as is the complicated polymerization process. Moreover, volatile toxic breakdown products, such as for example methyl bromide, are produced during vulcanization of copolymers containing bromine/iodine.

While fluororubbers based on tetrafluoroethylene and propylene may indeed also be peroxide vulcanized without particular cure-site units, they exhibit substantial disadvantages such as an excessively high glass transition temperature and, due to the high proportion of non-fluoromonomers, poor swelling properties in aprotic solvents. However, peroxide vulcanization, initiated by H abstraction from the incorporated propene sequences, requires relatively large quantities of peroxide (D. E. Hull, Kautsch. Gummi Kunstst. 38 (1985), 480–484). By means of terpolymerization of tetrafluoroethylene with propene and vinylidene fluoride, polymer sequences may be created which may subsequently be modified in a separate stage by HF elimination to facilitate more efficient vulcanization (U.S. Pat. No. 4,758, 618).

According to the known prior art, peroxide curable fluororubbers with fluorine contents of >60 wt. % must contain cure-site units, which are introduced into the polymer chain during polymerization or in a subsequent stage.

The object of the present invention is thus to provide peroxide curable fluororubbers which contain no reactive sites, or so-called cure-site units, in addition to the fluoromonomers forming the polymer chain.

It is known that the homo- and copolymerization of monomers containing fluorine may be initiated by a redox system consisting of a manganese compound and a reducing agent. The redox initiator system is used for the production of fluorinated thermoplastic copolymers of tetrafluoroethylene (DE 1 720 801, DE 2 037 028, DE 4 022 405, DE 3 024 450).

The present invention provides peroxide curable fluororubbers which contain no cure-site units in addition to the fluoromonomers forming the polymer chain.

In the fluororubbers according to the invention, the fluoromonomers forming the polymer chain are substantially fluorinated ethylenes, such as vinylidene fluoride, tetrafluoroethylene and chlorotrifluoroethylene, and fluorinated vinyl compounds, such as hexafluoropropene, hydropentafluoropropene, chloropentafluoropropene and perfluorinated vinyl ethers of the formula $CF_2=CF-O(-CF_2-CFX-O)_n-R_F$, where n=1-4, X=F or $CF_3$ and $R_F=C_1-C_3$-perfluoroalkyl. Vinyl esters, for example vinyl acetate, may additionally be contained in the polymer chain in proportions of up to 20 mol-%.

In one embodiment of the present invention, the fluoromonomers forming the polymer chain are preferably vinylidene fluoride ($CF_2=CH_2$), hexafluoropropene ($CF_2=CF-CF_3$) optionally together with tetrafluoroethylene ($CF_2=CF_2$) and/or perfluorinated vinyl ethers of the formula $CF_2=CF-O(-CF_2-CFX-O)_n-R_F$, where n=1-4, X=F or $CF_3$ and $R_F=C_1-C_3$-perfluoroalkyl.

The fluorinated vinyl compounds are contained in the fluoromonomers usable according to the invention, in addition to the fluorinated ethylenes and optionally non-fluorinated monomers, in quantities such that they completely suppress crystallization of the polymer chain and amorphous, rubbery copolymers are produced. In vinylidene fluoride/hexafluoropropene copolymers, the preferred hexafluoropropene content is thus 30–18 mol-%. In vinylidene fluoride/tetrafluoroethylene/hexafluoropropene terpolymers, the lower limit may be as low as 16 mol-% of hexafluoropropene, depending upon the tetrafluoroethylene content. Typical contents of perfluorinated vinyl ethers which may be used according to the invention are between 5 and 20 mol-%. The resultant fluororubbers according to the invention have fluorine contents of >60 wt. %.

The number average of the molecular weights of the resultant fluororubbers are between $8 \times 10^4$ and $10^6$ g/mol.

The present invention additionally provides a process for the production of the peroxide curable fluororubbers according to the invention, in accordance with which polymerization of the fluoromonomers forming the polymer chain is performed in an aqueous dispersion at temperatures of 5°–30° C., a pressure of 5–25 bar with an initiator system comprising at least one manganese compound in an oxidation state of $\geq 3$, optionally together with a reducing agent at pH values of 2 to 5, the manganese compound being used in a quantity of 0.1 to 5 parts by weight per 1000 parts by weight of the polymerized fluoromonomer.

The initiator system usable in the process according to the invention comprises a) at least one manganese compound or a mixture of two or more manganese compounds in an oxidation state of $\geq 3$ and optionally b) a reducing agent, such as for example carboxylic acids, dicarboxylic acids, polyhydric alcohols and hydroxycarboxylic acids.

Compounds which may here be used according to the invention are manganese compounds in oxidation states of ≧3, such as for example $MnO_4^-$, $MnO_4^{2-}$ or $MnO_4^{3-}$, preferably alkali metal manganates, wherein potassium is the preferred alkali metal. Mn complexes produced from the reaction of Mn compounds in oxidation states of between 3 and 7 with the above-stated reducing agents, such as the stable oxalato complexes of the formula $[Mn(C_2O_4)_m]^{3-2m}$, where m=1 to 3, may also be used as educts. If the exponent 3−2m=x in the above-stated formula has a negative numerical value, this is synonymous with the value x−, just as positive x− values mean the value x+.

On reduction of the manganese compounds, which are present in oxidation states of >3, the fluoromonomers used initially act as reducing agents, which are themselves reduced to compounds as are described above as reducing agents. For example, oxalic acid is thus produced from tetrafluoroethylene. The reducing agents required for the actual polymerization initiating stage, the reduction of Mn(III) to Mn(II), are thus also intermediately formed as oxidation products of the fluoromonomers themselves, such that polymerization is also possible in the absence of an additional reducing agent. However, in order to achieve better space-time yields and better pH value buffering, the introduction of an additional reducing agent has proved advantageous. The reducing agents according to the invention may, however, also be used as a mixture of two or more reducing agents.

Reducing agents which are preferably used according to the invention are compounds which may be oxidized with elimination of $CO_2$, such as for example carboxylic acids, dicarboxylic acids, hydroxycarboxylic acids or polyhydroxyalkanes, preferably oxalic acid, tartaric acid (dihydroxysuccinic acid), isobutyric acid, citric acid, ascorbic acid and glycerol.

The reducing agents preferably used in the process according to the invention are carboxylic acids, dicarboxylic acids, polyhydroxyalkanes, such as for example glycol and glycerol, or hydroxycarboxylic acids.

The initiator system preferably used in the process according to the invention is either the salt of permanganic acid in combination with oxalic acid/oxalate salt or directly the oxalato complex of trivalent manganese of the formula $[Mn(C_2O_4)_m]^{3-2m}$, where m=1 to 3.

Known processing parameters for the copolymerization of monomers containing fluorine may be used in the production of the fluororubbers according to the invention. Copolymerization may be performed continuously or semi-continuously in an aqueous dispersion in an autoclave.

In the preferred case of the semi-continuous process, an aqueous liquor and a proportion of the monomers in accordance with their reactivity and the desired insertion ratio are introduced into the reaction vessel. Once polymerization has been initiated, the internal pressure of the autoclave is held constant by injecting further quantities of the constituents of the monomer mixture which are reacted to polymer in accordance with the reaction rate.

With regard to the good properties of the fluororubbers (copolymers) to be produced, it is necessary to use a quantity of manganese compounds of 0.1 to 5 parts by weight, preferably 0.4 to 3 parts, related to 1000 parts by weight of the polymerised fluoromonomers, which corresponds to 0.033 to 1.67 wt. %, preferably 0.13 to 1 wt. %, based on the aqueous phase. The catalyst or catalyst mixture may be added to the liquor in single portions at the beginning of polymerization or the catalyst solution may be continuously metered in over the course of the polymerization operation, the latter method being preferred.

The quantity of reducing agent is 0 to 40 parts related to 1000 parts of the polymerized fluoromonomers.

With regard to the cleanliness of the process in terms of the prevention of the formation of manganese dioxide and of the space-time yield of the copolymers to be produced, it is advantageous when using a reducing agent to use it in quantities of 1 to 40 parts, preferably 2 to 20 parts, related to 1000 parts of the polymerized fluoromonomers. The reducing agent is preferably introduced into the initial aqueous polymerization liquor.

With further regard to the cleanliness of the process and the space-time yield, polymerization is performed in the pH range below pH 6, preferably from pH 2 to pH 5. It is preferred to use a reducing agent which also acts as a pH buffer. For example, ammonium oxalate and oxalic acid, which act both as reducing agent and buffer, are preferably used.

In the preferred case of emulsion polymerization, the dispersion is stabilized only with emulsifiers containing fluorine, only with a seed latex or with a mixture of a seed latex and fluorinated emulsifier. Perfluorinated emulsifiers are preferably used, such as for example water soluble salts of $C_6$–$C_{12}$-perfluorocarboxylic acids or $C_6$–$C_{12}$-perfluorosulphonic acids. Examples which may be cited in this connection are the sodium or ammonium salts of perfluorooctanoic acid and the lithium salt of perfluorooctylsulphonic acid. The emulsifiers are used at a concentration of 0.05 to 2 wt. %, preferably 0.1 to 0.5 wt. %, related to the aqueous phase. The emulsifier may be added to the liquor before the beginning of polymerization or it may also optionally be metered in continuously over the course of the polymerization operation.

If a seed latex is used, it comprises of fluoropolymer particles with an average particle size of ≦60 nm, which are stabilized with one or more of the stated emulsifiers.

The fluororubbers according to the invention may be cured using customary methods with free radicals. Preferably used free-radical initiators are peroxides having a decomposition half-life of at least 5 minutes at temperatures above 100° C., such as for example dibenzoyl peroxide, t-butylperoxybenzene, bis-(t-butylperoxy-isopropyl) benzene, 2,5-bis-(t-butylperoxy)-2,5-dimethyl-hexane or 2,5-bis-(t-butylperoxy)-2,5-dimethylhex-3-yne.

The peroxides are here used in a quantity of 0.5–10 parts by weight, preferably 1–5 parts by weight, related to 100 parts of the fluororubbers according to the invention.

It is possible to add additional co-curing agents, especially in pressure curing, in order to obtain better vulcanization and mechanical properties. Many compounds with two or more double bonds may act as co-curing agents, such as for example triallyl cyanurate, triallyl isocyanurate, tri (meth) allyl isocyanurate, tetramethyltetravinylcyclotetrasiloxane, triallyl phosphite and N,N'-m-phenylene-bis-maleimide, which are contained in quantities of 0.1–15, preferably 0.5–10 parts by weight, related to 100 parts of the fluororubbers according to the invention.

The vulcanizable compound also contains as acid acceptors oxides or hydroxides of metals, for example magnesium, calcium, lead, zinc and barium, or at least one basic salt with an organic acid residue, such as sodium stearate, magnesium oxalate or carbonate or basic lead phosphate or a combination thereof in proportions of no more than 15 parts by weight related to 100 parts of the fluororubber according to the invention.

It is possible to add further known fillers, reinforcing agents, plasticizers, lubricants, processing auxiliaries, pigments or the like.

Incorporation of the stated constituents of the compound into the rubber compound according to the invention proceeds using customary compounding methods, for example in a roll mill or internal mixer.

Vulcanization generally proceeds in a first stage under pressure at 120° to 200° C. to yield a form providing dimensional stability and post-vulcanization to achieve the final properties is then performed in a circulating air oven.

All values stated hereinbelow are parts by weight unless otherwise expressed.

PRACTICAL EXAMPLES

Production of seed latex 1

3.7 kg of deionized water were introduced into a 6 liter autoclave and 54 g of sodium perfluorocaprylate dissolved therein. The sealed autoclave was then pressurized three times with nitrogen to a pressure of 10 bar and then depressurized to standard pressure. 510 g of hexafluoropropene and 280 g of vinylidene fluoride were then introduced into the autoclave and the reaction mixture was heated to 75° C. while being stirred. When this temperature was reached, the internal pressure in the autoclave was 38.6 bar. Polymerization was initiated by adding 50 ml of an aqueous ammonium peroxydisulphate solution (90 g/l). During polymerization, further quantities of a monomer mixture prepared from 60 wt. % vinylidene fluoride and 40 wt. % hexafluoropropene were injected in such a manner that the internal pressure in the autoclave was held constant. Over a total run time of 13 minutes, a total of 330 g of vinylidene fluoride and 220 g of hexafluoropropene were pumped in in this manner. Polymerization was terminated by venting the unreacted gas mixture and cooling the contents of the autoclave. 4.45 kg of a coagulate-free aqueous emulsion having a solids content of 15.8% were obtained.

Production of seed latex 2

21.85 kg of a coagulate-free aqueous emulsion having a solids content of 13.6% was produced in a 36 liter autoclave in a similar manner to that stated for the production of seed latex 1, by performing initiation with an aqueous initial mixture which contained 0.53 wt. % of lithium perfluorooctylsulphonate instead of the perfluorinated carboxylic acid, and additionally 0.1 wt. % of lithium carbonate.

EXAMPLE 1

3700 g of deionized water and 300 g of seed latex 1 were introduced into a 6 liter autoclave. 30 g of ammonium oxalate monohydrate were dissolved in this initial mixture and the entire liquor was adjusted to pH 3 with hydrochloric acid. The sealed autoclave was then pressurized four times with nitrogen to a pressure of 10 bar and then depressurized to standard pressure. 90 g of vinylidene fluoride and 120 g of hexafluoropropene were then introduced into the autoclave and the reaction mixture was heated to 25° C. while being stirred. When this temperature had been reached, the internal pressure in the autoclave was 12.4 bar. Polymerization was initiated by the continuous addition of 100 ml per hour of an aqueous solution containing 10 g/l of potassium permanganate. The permanganate concentration was 0.16 wt. %, based on the aqueous phase ($\Delta$3.19 g/kg polymerized fluoromonomer). During polymerization, further quantities of a monomer mixture prepared from 60 wt. % vinylidene fluoride and 40 wt. % hexafluoropropene were injected in such a manner that the internal pressure in the autoclave was maintained at 12.4 bar. Over a total run time of 6.5 hours, a total of 900 g of vinylidene fluoride and 600 g of hexafluoropropene were pumped in in this manner. Polymerization was terminated by venting the unreacted gas mixture and cooling the contents of the autoclave. 5900 g of a coagulate-free aqueous emulsion having a solids content of 25.2% were obtained.

In order to coagulate the product, the emulsion was poured into a 4% aqueous magnesium sulphate solution. The product was washed with water and then dried, whereby 1464 g of a rubbery copolymer was obtained. The following copolymer composition was determined using $^{19}$F-NMR analysis: 22.7 mol-% hexafluoropropene, 77.3 mol-% vinylidene fluoride.

The copolymer is completely soluble in THF. The Mooney viscosity of the product, $ML_{1+10}$ (100° C.), is 129 units.

In order to vulcanize the product, a blend consisting of 100 parts by weight of the product from Example 1, 3 parts by weight of calcium hydroxide, 4 parts by weight of Perkalink® 301/50 (triallyl isocyanurate, 50% inactive fillers) and 3 parts by weight of Luperco® 130 X (2,5-dimethyl-2,5-bis(tert.-butyl)hexane; 45% inactive fillers) was prepared. Vulcanization behavior was investigated at 170° C. using a Vulkameter MDR2000E apparatus from Monsanto. In order to investigate the mechanical properties of the vulcanized product, moldings (1×10×10 mm sheets) were produced under pressure at 170° C. from the stated vulcanizable compounds and vulcanized for 30 minutes and then post-vulcanized in a circulating air oven (1 hour at 160° C., 1 hour at 170° C., 2 hours at 180° C. and 20 hours at 200° C.). The results, described below as MDR results, ($s'_{min}$ and $s'_{max}$=minimum and maximum torque values respectively) and mechanical properties are shown in Table 1.

EXAMPLE 2

119 kg of deionized water, 9.75 kg of seed latex 2 and 1.3 kg of a 31% solution of lithium perfluorooctylsulphonate were introduced into a 195 liter autoclave. 200 g of oxalic acid dihydrate were dissolved in this initial mixture and the entire liquor was adjusted to pH 3 with lithium hydroxide. The sealed autoclave was then pressurized four times with nitrogen and then depressurized to standard pressure. 1.94 kg of vinylidene fluoride and 2.37 kg of hexafluoropropene were then introduced into the autoclave and the reaction mixture was heated to 25° C. while being stirred. Once this temperature had been reached, the internal pressure in the autoclave was 13.3 bar. Polymerization was initiated by the continuous addition of an aqueous solution containing 10 g/l of potassium permanganate. The permanganate concentration was 0.021 wt. %, based on the aqueous phase ($\Delta$1.69 g/kg polymerized fluoromonomer). During polymerization, further quantities of a monomer mixture prepared from 60 wt. % vinylidene fluoride and 40 wt. % hexafluoropropene were injected in such a manner that the internal pressure in the autoclave was maintained at 13.3 bar. Over a total run time of 6.5 hours, a total of 20.2 kg of vinylidene fluoride, 13.54 kg of hexafluoropropene and 2.76 kg of potassium permanganate solution were pumped in in this manner. Polymerization was terminated by venting the unreacted gas mixture and cooling the contents of the autoclave. 168.1 kg of a coagulate-free aqueous emulsion having a solids content of 22% were obtained.

A portion of the emulsion was coagulated as in Example 1. Copolymer composition: 20.9 mol-% hexafluoropropene, 79.1 mol-% vinylidene fluoride.

The copolymer is completely soluble in THF. The Mooney viscosity of the product, $ML_{1+10}$ (100° C.), is 96 units.

In order to vulcanize the product, a blend was produced and investigated as in Example 1. The properties are shown in Table 1.

EXAMPLE 3

8 kg of deionized water and 12 g of perfluorooctanoic acid were introduced into a 12 liter autoclave. 25 g of oxalic acid dihydrate were dissolved in this initial mixture and the entire liquor was adjusted to pH 3 with ammonium hydroxide. The sealed autoclave was then pressurized four times with nitrogen to a pressure of 10 bar and then depressurized to standard pressure. 180 g of vinylidene fluoride and 220 g of hexafluoropropene were then introduced into the autoclave and the reaction mixture was heated to 25° C. while being stirred. When this temperature had been reached, the internal pressure in the autoclave was 12.1 bar. Polymerization was initiated by the continuous addition of 100 ml per hour of an aqueous solution containing 10 g/l of potassium permanganate. The permanganate concentration was 0.035 wt. %, based on the aqueous phase ($\Delta$0.81 g/kg polymerized fluoromonomer). During polymerization, further quantities of a monomer mixture prepared from 60 wt. % vinylidene fluoride and 40 wt. % hexafluoropropene were injected in such a manner that the internal pressure in the autoclave was maintained at 12.1 bar. Over a total run time of 2.8 hours, a total of 1.5 kg of vinylidene fluoride and 1.0 kg of hexafluoro-propene were pumped in in this manner. Polymerization was terminated by venting the unreacted gas mixture and cooling the contents of the autoclave. 11.12 kg of a coagulate-free aqueous emulsion having a solids content of 24.1% were obtained.

The emulsion was coagulated as in Example 1. Copolymer composition: 21.9 mol-% hexafluoropropene, 78.1 mol-% vinylidene fluoride.

The copolymer is completely soluble in THF. The Mooney viscosity of the product, $ML_{1+10}$ (100° C.), is 111 units.

EXAMPLE 4

8 kg of deionized water and 50 g of a 31% solution of lithium perfluorooctylsulphonate were introduced into a 12 liter autoclave. 9 g of oxalic acid dihydrate were dissolved in this initial mixture and the entire liquor was adjusted to pH 3 with lithium hydroxide. The sealed autoclave was then pressurized four times with nitrogen to a pressure of 10 bar and then depressurized to standard pressure. 180 g of vinylidene fluoride and 240 g of hexafluoropropene were then introduced into the autoclave and the reaction mixture was heated to 25° C. while being stirred. When this temperature had been reached, the internal pressure in the autoclave was 14.0 bar. Polymerization was initiated by the continuous addition of 100 ml per hour of an aqueous solution containing 5 g/l of potassium permanganate. The permanganate concentration was 0.021 wt. %, based on the aqueous phase ($\Delta$0.42 g/kg polymerized fluoromonomer). During polymerization, further quantities of a monomer mixture prepared from 60 wt. % vinylidene fluoride and 40 wt. % hexafluoropropene were injected in such a manner that the internal pressure in the autoclave was maintained at 14 bar. Over a total run time of 4 hours, a total of 1.5 kg of vinylidene fluoride and 1.0 kg of hexafluoropropene were pumped in in this manner. Polymerization was terminated by venting the unreacted gas mixture and cooling the contents of the autoclave. 11.06 kg of a coagulate-free aqueous emulsion having a solids content of 23.7% were obtained.

The emulsion was coagulated as in Example 1. Copolymer composition: 21.1 mol-% hexafluoropropene, 78.9 mol-% vinylidene fluoride.

The copolymer is completely soluble in THF. The Mooney viscosity of the product, $ML_{1+10}$ (100° C.), is 102 units.

EXAMPLE 5

130 kg of deionized water and 1.3 kg of a 31% solution of lithium perfluorooctylsulphonate were introduced into a 195 liter autoclave. 200 g of oxalic acid dihydrate were dissolved in this initial mixture and the entire liquor was adjusted to pH 3 with lithium hydroxide. The sealed autoclave was then pressurized four times with nitrogen and then depressurized to standard pressure. 1.7 kg of vinylidene fluoride, 2.05 kg of hexafluoropropene and 0.38 kg of tetrafluoroethylene were then introduced into the autoclave and the reaction mixture was heated to 25° C. while being stirred. When this temperature had been reached, the internal pressure in the autoclave was 13.3 bar. Polymerization was initiated by the continuous addition of an aqueous solution containing 10 g/l of potassium permanganate. The permanganate concentration was 0.016 wt. %, based on the aqueous phase ($\Delta$0.51 g/kg polymerized fluoromonomer). During polymerization, further quantities of a monomer mixture prepared from 54.25 wt. % vinylidene fluoride, 36.25 wt. % hexafluoropropene and 9.5 wt. % tetrafluoroethylene were injected in such a manner that the internal pressure in the autoclave was maintained at 13.3 bar. Over a total run time of 2.1 hours, a total of 21.7 kg of vinylidene fluoride, 14.5 kg of hexafluoropropene, 3.8 kg of tetrafluoroethylene and 2.1 kg of potassium permanganate solution were pumped in in this manner. Polymerization was terminated by venting the unreacted gas mixture and cooling the contents of the autoclave. 176.3 kg of a coagulate-free aqueous emulsion having a solids content of 24% were obtained.

The emulsion was coagulated as in Example 1. Copolymer composition: 16.7 mol-% hexafluoropropene, 73.6 mol-% vinylidene fluoride, 9.7 mol-% tetrafluoroethylene.

COMPARATIVE EXAMPLE 1

The crude rubber produced according to Example 1 was blended and vulcanized as in Example 1, but without addition of the peroxide (Luperco® 130 XL). The results in Table 1 show that the vulcanization compound cannot be cured in the absence of peroxide.

COMPARATIVE EXAMPLE 2

2400 ml of deionized water were introduced into a 6 liter autoclave. 100 g of seed latex 1, 7 g of sodium perfluorocaprylate and 15 g of potassium peroxydisulphate were dissolved in this initial amount. The sealed autoclave was then pressurized three times with nitrogen to a pressure of 10 bar and then depressurized to standard pressure. 750 g of hexafluoropropene and 480 g of vinylidene fluoride were then introduced into the autoclave and the reaction mixture was heated to 50° C. while being stirred. When this temperature had been reached, the internal pressure in the autoclave was 27.3 bar. polymerization was initiated by the continuous addition of 15 ml per hour of an aqueous solution containing triethanolamine (75 g/l). 19 ml/h of methyl acetate were additionally injected into the autoclave. During polymerization, further quantities of a monomer mixture prepared from 60 wt. % vinylidene fluoride and 40 wt. % hexafluoropropene were injected in such a manner that the internal pressure in the autoclave was held constant. Over a total run time of 2 hours, a total of 300 g of vinylidene fluoride and 200 g of hexafluoropropene were pumped in in this manner. Polymerization was terminated by venting the unreacted gas mixture and cooling the contents of the autoclave. 3.17 kg of a coagulate-free aqueous emulsion having a solids content of 19.9% were obtained.

The emulsion was coagulated as in Example 1. Copolymer composition: 25 mol-% hexafluoropropene, 75 mol-% vinylidene fluoride.

The copolymer is completely soluble in THF. The Mooney viscosity of the product, $ML_{1+10}$ (100° C.), is 124 units.

In order to vulcanize the product, a blend was produced and investigated as in Example 1. The properties are shown in Table 1.

COMPARATIVE EXAMPLE 3

In a similar manner to Example 1, a vulcanization compound was produced and investigated using a customary commercial vinylidene fluoride/hexafluoropropene copolymer from Montefluos (tradename: Tecnoflon, composition: 21.8 mol-% hexafluoropropene, 78.2 mol-% vinylidene fluoride, $ML_{1+10}$ (100° C.): 80).

The results of the MDR measurements for comparative tests 2 and 3 show that vinylidene fluoride/hexafluoropropene copolymers which contain no special cure-site units and produced using other initiator systems cannot be cured by free-radical methods using peroxides. The moldings produced from them flow so, no further mechanical properties were determined in the tensile test.

COMPARATIVE EXAMPLE 4

4 kg of deionized water and 50 g of perfluorooctanoic acid were introduced into a 6 liter autoclave. 16 g of ammonium oxalate dihydrate were dissolved in this mixture and the entire liquor was adjusted to pH 3 with hydrochloric acid. The sealed autoclave was then pressurized four times with nitrogen to a pressure of 10 bar and then depressurized to standard pressure. 100 g of vinylidene fluoride and 200 g of hexafluoropropene were then introduced into the autoclave and the reaction mixture was heated to 20° C. with stirring. When this temperature was reached the internal pressure in the autoclave was 9.5 bar. To initiate the reaction 100 ml of a 0.4 wt. % aqueous potassium permanganate solution were introduced into the autoclave under pressure. After the addition of the permanganate solution the pressure in the autoclave was 9.7 bar. The permanganate concentration in the aqueous liquor was 0.0095 wt. %.

After two hours the pressure in the autoclave was still 9.7 bar. The unreacted gas mixture was vented and the contents of the autoclave were cooled. 4.25 g of a clear solution with a solids content of 0.38 wt. % were obtained. No polymer had been formed.

Vulcanisation results:

TABLE 1

| Example | $ML_{1+10}$ (100° C.) | MDR s'min dNm | MDR s'max dNm | Tensile strength MPa | Elongation at break % |
|---|---|---|---|---|---|
| 1 | 129 | 6.7 | 15.9 | 19.8 | 342 |
| 2 | 96 | 8.3 | 19.6 | 17.4 | 250 |
| 3 | 111 | 7.2 | 18.8 | 21.8 | 374 |
| 4 | 102 | 7.0 | 17.9 | 20.2 | 369 |
| 5 | 79* | 9.6 | 22.4 | 22.6 | 286 |
| Comparative Example 1 | 129 | 6.2 | 7.9 | — | — |
| Comparative Example 2 | 124 | 1.26 | 5.79 | — | — |
| Comparative Example 3 | 80 | 1.03 | 4.48 | — | — |

It will be understood that the specification and examples are illustrative but not limitative of the present invention and that other embodiments within the spirit and scope of the invention will suggest themselves to those skilled in the art.

We claim:

1. A process for the production of a peroxide curable fluororubber comprising polymerizing bromine-and iodine-free fluoromonomers in an aqueous dispersion at a temperature of 5°–30° C. and a pressure of 5–25 bar with an initiator system comprising at least one manganese compound in an oxidation state of $\geq 3$, optionally together with a reducing agent at a pH value of 2–5, the manganese compound being used in a quantity of 0.1 to 5 pars by weight per 1000 parts by weight of the polymerized fluoromonomer.

2. A fluororubber produced by the process of claim 1, wherein the polymer chain comprises units of vinylidene fluoride ($CF_2=CH_2$) and hexafluoropropene ($CF_2=CF-CF_3$) and optionally at least one of tetrafluoroethylene ($CF_2=CF_2$) and perfluorinated vinyl ethers of the formula $CF_2-CF-O(-CF_2-CFX-O)_n-R_F$, where n=1-4, X=F or CF and $R_F=C_1-C_3$-perfluoroalkyl.

3. A cured fluororubber produced by curing a fluororubber according to claim 2 with a peroxide.

4. A composition comprising a fluorocarbon rubber according to claim 2 and a peroxide curing agent.

5. A cured rubber produced by curing a composition according to claim 4.

6. A process according to claim 1, wherein the reducing agent comprises at least one carboxylic acid, dicarboxylic acid, polyhydroxyalkane or hydroxycarboxylic acid.

7. A process according to claim 1, wherein the initiator system used is either a permanganate salt in combination with oxalic acid/oxalate salt or directly the oxalate complex of trivalent manganese of the formula $[Mn(C_2O_4)_m]^{3-2m}$, where m=1 to 3.

8. A process for producing a cured fluororubber, which comprises curing with a peroxide a fluororubber substantially free of bromine- and iodine-containing cure sites.

* * * * *